United States Patent
Heath, Jr. et al.

(10) Patent No.: US 6,298,092 B1
(45) Date of Patent: Oct. 2, 2001

(54) METHODS OF CONTROLLING COMMUNICATION PARAMETERS OF WIRELESS SYSTEMS

(75) Inventors: Robert W. Heath, Jr., Hayward; Peroor K. Sebastian, Mountain View; Arogyaswami J. Paulraj, Stanford, all of CA (US)

(73) Assignee: Iospan Wireless, Inc., San Jose, CA (US)

( * ) Notice: Subject to any disclaimer, the term of this patent is extended or adjusted under 35 U.S.C. 154(b) by 0 days.

(21) Appl. No.: 09/585,948

(22) Filed: Jun. 2, 2000

Related U.S. Application Data

(63) Continuation-in-part of application No. 09/464,372, filed on Dec. 15, 1999.

(51) Int. Cl.[7] .............................. H04B 7/06; H04B 7/08
(52) U.S. Cl. ..................... 375/267; 375/299; 375/347; 455/69; 455/101; 455/102; 455/272
(58) Field of Search ...................... 375/216, 267, 375/299, 347; 455/69, 101, 102, 135, 136, 272

(56) References Cited

U.S. PATENT DOCUMENTS

| | | |
|---|---|---|
| 5,815,488 | 9/1998 | Williams et al. . |
| 5,832,044 * | 11/1998 | Sousa et al. .......................... 375/347 |
| 5,933,421 | 8/1999 | Alamouti et al. . |
| 6,058,105 | 5/2000 | Hochwald et al. .................. 370/310 |
| 6,064,662 | 5/2000 | Gitlin et al. . |
| 6,097,771 | 8/2000 | Foschini ............................... 375/346 |
| 6,144,711 | 11/2000 | Raleigh et al. ....................... 375/347 |
| 6,175,550 | 1/2001 | Van Nee ............................... 370/206 |
| 6,198,775 * | 3/2001 | Khayrallah et al. .................. 375/265 |

FOREIGN PATENT DOCUMENTS

| | | | |
|---|---|---|---|
| 0951091A2 | 10/1999 | (EP) ............................... H01Q/3/26 |
| WO 98/09381 | 3/1998 | (WO) . | |
| WO98/09385 | 3/1998 | (WO) ............................... H04B/7/02 |

OTHER PUBLICATIONS

Paulraj, A., *Taxonomy of space–time processing for wireless networks*, IEE Proc—Radar Sonar Navig., vol. 145, No. 1, Feb. 1998.

* cited by examiner

*Primary Examiner*—Amanda T. Le
(74) *Attorney, Agent, or Firm*—Lumen Intellectual Property Services

(57) ABSTRACT

The present invention provides a method for controlling a communication parameter in a channel through which data is transmitted between a transmit unit with M transmit antennas and a receive unit with N receive antennas by selecting from among proposed mapping schemes an applied mapping scheme according to which the data is converted into symbols and assigned to transmit signals $TS_p$, p=1 . . . M, which are transmitted from the M transmit antennas. The selection of the mapping scheme is based on a metric; in one embodiment the metric is a minimum Euclidean distance $d_{min,rx}$ of the symbols when received, in another embodiment the metric is a probability of error P(e) in the symbol when received. The method can be employed in communication systems using multi-antenna transmit and receive units of various types including wireless systems, e.g., cellular communication systems, using multiple access techniques such as TDMA, FDMA, CDMA and OFDMA.

55 Claims, 6 Drawing Sheets

METHODS OF CONTROLLING COMMUNICATION PARAMETERS OF WIRELESS SYSTEMS

RELATED APPLICATIONS

This patent application is a continuation-in-part of patent application Ser. No. 09/464,372 filed on Dec. 15, 1999, which is herein incorporated by reference.

FIELD OF THE INVENTION

The present invention relates generally to wireless communication systems and methods, and more particularly to controlling a communication parameter between transmit and receive units with multiple antennas.

BACKGROUND OF THE INVENTION

Wireless communication systems serving stationary and mobile wireless subscribers are rapidly gaining popularity. Numerous system layouts and communications protocols have been developed to provide coverage in such wireless communication systems.

The wireless communications channels between the transmit and receive devices are inherently variable and thus their quality fluctuates. Hence, their quality parameters also vary in time. Under good conditions wireless channels exhibit good communication parameters, e.g., large data capacity, high signal quality, high spectral efficiency and throughput. At these times significant amounts of data can be transmitted via the channel reliably. However, as the channel changes in time, the communication parameters also change. Under altered conditions former data rates, coding techniques and data formats may no longer be feasible. For example, when the channel performance is degraded the transmitted data may experience excessive corruption yielding unacceptable communication parameters. For instance, transmitted data can exhibit excessive bit-error rates or packet error rates. The degradation of the channel can be due to a multitude of factors such as general noise in the channel, multi-path fading, loss of line-of-sight path, excessive Co-Channel Interference (CCI) and other factors.

By reducing CCI the carrier-to-interference (C/I) ratio can be improved and the spectral efficiency increased. Specifically, improved C/I ratio yields higher per link bit rates, enables more aggressive frequency re-use structures and increases the coverage of the system.

It is also known in the communication art that transmit units and receive units equipped with antenna arrays, rather than single antennas, can improve receiver performance. Antenna arrays can both reduce multipath fading of the desired signal and suppress interfering signals or CCI. Such arrays can consequently increase both the range and capacity of wireless systems. This is true for wireless cellular telephone and other mobile systems as well as Fixed Wireless Access (FWA) systems.

In mobile systems, a variety of factors cause signal degradation and corruption. These include interference from other cellular users within or near a given cell. Another source of signal degradation is multipath fading, in which the received amplitude and phase of a signal varies over time. The fading rate can reach as much as 200 Hz for a mobile user traveling at 60 mph at PCS frequencies of about 1.9 GHz. In such environments, the problem is to cleanly extract the signal of the user being tracked from the collection of received noise, CCI, and desired is signal portions summed at the antennas of the array.

In FWA systems, e.g., where the receiver remains stationary, signal fading rate is less than in mobile systems. In this case, the channel coherence time or the time during which the channel estimate remains stable is longer since the receiver does not move. Still, over time, channel coherence will be lost in FWA systems as well.

Antenna arrays enable the system designer to increase the total received signal power, which makes the extraction of the desired signal easier. Signal recovery techniques using adaptive antenna arrays are described in detail, e.g., in the handbook of Theodore S. Rappaport, *Smart Antennas, Adaptive Arrays, Algorithms, & Wireless Position Location*; and Paulraj, A. J et al., "Space-Time Processing for Wireless Communications", IEEE Signal Processing Magazine, Nov. 1997, pp. 49–83.

Prior art wireless systems have employed adaptive modulation of the transmitted signals with the use of feedback from the receiver as well as adaptive coding and receiver feedback to adapt data transmission to changing channel conditions. However, effective maximization of channel capacity with multiple transmit and receive antennas is not possible only with adaptive modulation and/or coding.

In U.S. Pat. Nos. 5,592,490 to Barratt et al., 5,828,658 to Ottersten et al., and 5,642,353 Roy III, teach about spectrally efficient high capacity wireless communication systems using multiple antennas at the transmitter; here a Base Transceiver Station (BTS) for Space Division Multiple Access (SDMA). In these systems the users or receive units have to be sufficiently separated in space and the BTS uses its transmit antennas to form a beam directed towards each receive unit. The transmitter needs to know the channel state information such as "spatial signatures" prior to transmission in order to form the beams correctly. In this case spatial multiplexing means that data streams are transmitted simultaneously to multiple users who are sufficiently spatially separated.

The disadvantage of the beam-forming method taught by Barratt et al., Ottersten et al., and Roy III is that the users have to be spatially well separated and that their spatial signatures have to be known. Also, the channel information has to be available to the transmit unit ahead of time and the varying channel conditions are not effectively taken into account. Finally, the beams formed transmit only one stream of data to each user and thus do not take full advantage of times when a particular channel may exhibit very good communication parameters and have a higher data capacity for transmitting more data or better signal-to-noise ratio enabling transmission of data formatted with a less robust coding scheme.

U.S. Pat. No. 5,687,194 to Paneth et al. describes a Time Division Multiple Access (TDMA) communication system using multiple antennas for diversity. The proposed system exploits the concept of adaptive transmit power and modulation. The power and modulation levels are selected according to a signal quality indicator fed back to the transmitter.

Addressing the same problems as Paneth et al., U.S. Pat. No. 5,914,946 to Avidor et al. teaches a system with adaptive antenna beams. The beams are adjusted dynamically as the channel changes. Specifically, the beams are adjusted as a function of a received signal indicator in order to maximize signal quality and reduce the system interference.

The prior art also teaches using multiple antennas to improve reception by transmitting the same information, i.e., the same data stream from all antennas. Alternatively, the prior art also teaches that transmission capacity can be increased by transmitting a different data stream from each antenna. These two approaches are commonly referred to as antenna diversity schemes and spatial multiplexing schemes.

Adaptive modulation and/or coding in multiple antenna systems involve mapping of data converted into appropriate symbols to the antennas of the transmit antenna array for transmission. Prior art systems do not teach rules suitable for determining such mappings under varying channel conditions. Specifically, the prior art fails to teach efficient methods and rules for mapping data signals to antennas in systems using multiple transmit antennas and multiple receive antennas in order to control one or more communications parameters under varying channel conditions. Development of methods and rules for selecting appropriate mapping schemes from the many possible choices would represent a significant advance in the art.

SUMMARY

The present invention provides a metric for selecting appropriate mapping schemes for transmitting data while controlling a communication parameter in a channel between a wireless transmit and receive unit, both using multiple antennas. The method of the invention teaches how to select mapping schemes based on the metric which takes into account a quality parameter of received signals or received data.

The method of the invention calls for controlling a communication parameter in a channel through which data is transmitted between a transmit unit with M transmit antennas and a receive unit with N receive antennas. The method calls for providing proposed mapping schemes according to which the data or bit stream is converted into symbols and assigned to transmit signals $TS_p$, p=1...M, which are transmitted from the M transmit antennas. A measurement of the channel at the receiver, e.g., a determination of the channel coefficients matrix H, is used to compute a minimum Euclidean distance $d_{min,rx}$ of the symbols when received in each of the proposed mapping schemes. This computation can be performed based on H and the proposed mapping schemes only. In this embodiment the minimum Euclidean distance $d_{min,rx}$ is used as a metric for selecting from the proposed mapping schemes an applied mapping scheme to be employed for transmission of the data. The selection of the mapping scheme based on the minimum Euclidean distance metric $d_{min,rx}$ allows one to control the communication parameter.

The data can be converted into symbols in accordance with any suitable modulation technique. For example, the data can be converted into symbols modulated in constellations selected from among PSK, QAM, GMSK, FSK, PAM, PPM, CAP, CPM or any other modulation scheme associating data with a constellation. The mapping scheme can involve coding the data at certain coding rates. Furthermore, the mapping scheme can include at least one method selected from among diversity coding and spatial multiplexing.

When the mapping scheme includes diversity coding a k-th order diversity coding, where k ranges from 1 to M, can be used. The diversity coding can be selected from techniques consisting of space-time block coding, transmit antenna selection, Equal Gain Combining (EGC), Maximum Ratio Combining (MRC) and delay diversity coding or any other antenna diversity scheme. Alternatively, the diversity coding can include a random assignment of the transmit signals $TS_p$ to k of the M transmit antennas. In accordance with yet another approach, the assignment of the transmit signals $TS_p$ to k of the M transmit antennas can be based on a required minimum Euclidean distance $d_{min,required}$. The required minimum Euclidean distance can be determined based on its relation to one or more quality parameters that the transmitted data has to maintain. For example, the quality parameter can be signal-to-interference noise ratio, signal-to-noise ratio, power level, level crossing rate, level crossing duration, bit error rate, symbol error rate, packet error rate, and error probability.

When the mapping scheme includes spatial multiplexing a k-th order spatial multiplexing (where k ranges from 1 to M) can be used. Spatial multiplexing can involve random assignment of the transmit signals $TS_p$ to k of the M transmit antennas. Alternatively, the assignment of the transmit signals $TS_p$ to k of the M transmit antennas can be based on the required minimum Euclidean distance $d_{min,required}$ necessary to maintain one or more of the quality parameters.

It is convenient to store a minimum Euclidean distance $d_{min,tr}$ of the symbols when transmitted in a database. The database can reside in the transmit unit or in the receive unit (or it can be available in both).

Among others, the communication parameter to be controlled can include data capacity, signal quality, spectral efficiency or throughput.

It is advantageous to establish a relation between the quality parameters and the required minimum Euclidean distances $d_{min,required}$ necessary to satisfy the quality parameters, i.e., maintain the quality parameter above a specified threshold. The relations between the minimum Euclidean distances $d_{min,required}$ for all possible mapping schemes and the corresponding quality parameters are also conveniently stored in a database.

The method of the invention can be employed in communication systems such as wireless systems, e.g., cellular communication systems, using multiple access techniques selected from among TDMA, FDMA, CDMA and OFDMA. In conjunction with these techniques the mapping schemes can include diversity coding selected from techniques including space-time block coding, transmit antenna selection, Equal Gain Combining (EGC), Maximum Ratio Combining (MRC) and delay diversity coding or any other antenna diversity scheme.

In another embodiment of the invention the metric used is the probability of error, P(e). In this case the measurement of the channel is used to compute for each of the proposed mapping schemes a probability of error P(e) in the symbol when received. The applied mapping scheme is then selected from the proposed mapping schemes based on the probability of error P(e) to control the communication parameter.

The proposed mapping schemes in this embodiment can include random or determined assignment of transmit signals $TS_p$ to k of the M transmit antennas as discussed above both in case of diversity coding and spatial multiplexing. In particular, the assignment can be based on a required probability of error $P(e)_{req}$.

The invention further encompasses a communication system which uses the minimum Euclidean distance $d_{min,rx}$ of said symbols when received, to select the applied mapping scheme from among the proposed mapping schemes. The invention also includes a communication system which uses the probability of error to select the appropriate applied mapping scheme.

A detailed description of the invention and the preferred and alternative embodiments is presented below in reference to the attached drawing figures.

DETAILED DESCRIPTION

Figure 1:
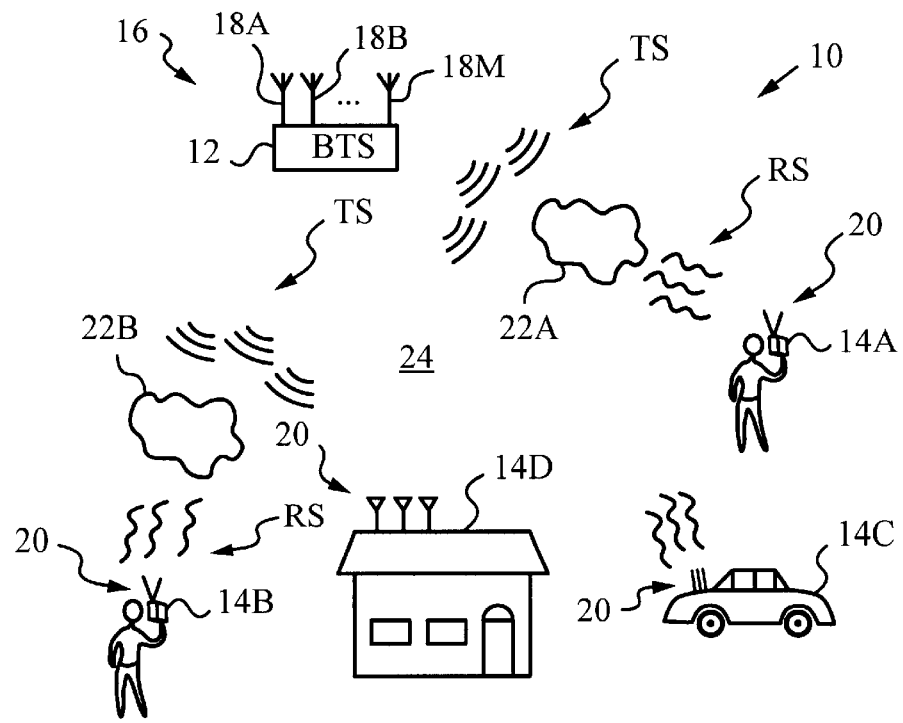
FIG. 1 is a simplified diagram illustrating a communication system in which the method of the invention is applied.
Figure 2:
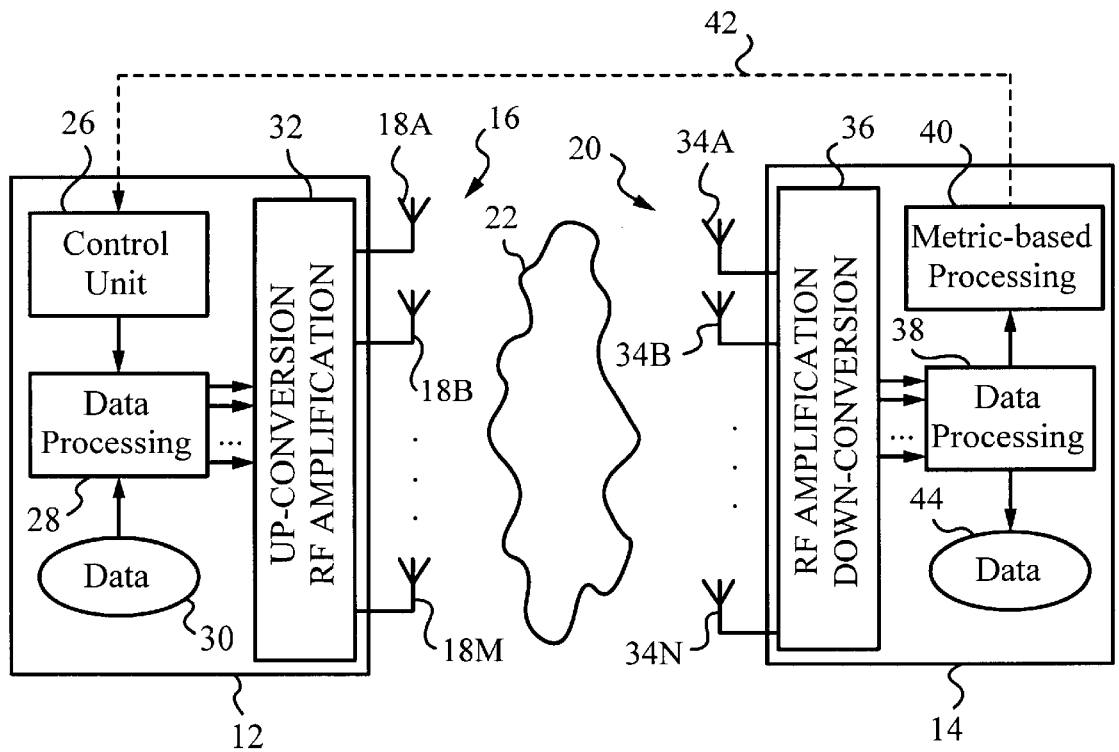
FIG. 2 is a simplified block diagram illustrating the transmit and receive units according to the invention.

The method and wireless systems of the invention will be best understood after first considering the high-level diagrams of FIGS. 1 and 2. FIG. 1 illustrates a portion of a wireless communication system 10, e.g., a cellular wireless system. For explanation purposes, the downlink communication will be considered where a transmit unit 12 is a Base Transceiver Station (BTS) and a receive unit 14 is a mobile or stationary wireless user device. Exemplary user devices include mobile receive units 14A, 14B, 14C which are portable telephones and car phones and a stationary receive unit 14D, which can be a wireless modem unit used at a residence or any other fixed wireless unit. Of course, the same method can be used in uplink communication from wireless units 14 to BTS 12.

BTS 12 has an antenna array 16 consisting of a number of transmit antennas 18A, 18B, . . . , 18M. Receive units 14 are equipped with antenna arrays 20 of N receive antennas (for details see FIGS. 2, 3 and 4). BTS 12 sends transmit signals TS to all receive units 14 via channels 22A and 22B. For simplicity, only channels 22A, 22B between BTS 12 and receive units 14A, 14B are indicated, although BTS 12 transmits TS signals to all units shown. In this particular case receive units 14A, 14B are both located within one cell 24. However, under suitable channel conditions BTS 12 can transmit TS signals to units outside cell 24, as is known in the art.

The time variation of channels 22A, 22B causes transmitted signals TS to experience fluctuating levels of attenuation, interference, multi-path fading and other deleterious effects. Therefore, communication parameters of channels 22A, 22B such as data capacity, signal quality, spectral efficiency or throughput undergo temporal changes. Thus, channels 22A, 22B can not at all times support efficient propagation of high data rate signals TS or signals which are not formatted with a robust coding algorithm.

In accordance with the invention, antenna array 16 at BTS 12 can be used for spatial multiplexing, transmit diversity or a combination of the two to reduce interference, increase array gain and achieve other advantageous effects. Antenna arrays 20 at receive units 14 can be used for spatial multiplexing, receive diversity or a combination of the two. All of these methods improve the capacity, signal quality, range and coverage of channels 22A, 22B. The method of the invention finds an optimum choice or combination of these techniques chosen adaptively with changing conditions of channels 22A, 22B. The method of the invention implements an adaptive and optimal selection of spatial multiplexing, diversity as well as rate of coding and bit-loading over transmit antenna array 16 to antenna array 20.

Specifically, the method of the invention addresses these varying channel conditions by adaptively controlling one or more communication parameters based on a metric. FIG. 2 illustrates the fundamental blocks of transmit unit 12 and one receive unit 14 necessary to employ the method. Transmit unit 12 has a control unit 26 connected to a data processing block 28 for receiving data 30 to be converted and mapped in the form of transmit signals TS in accordance with a number of proposed mapping schemes to transmit antennas 18A, 18B, . . . , 18M for transmission therefrom. An up-conversion and RF amplification block 32 supplies the transmit signals TS to antennas 18A, 18B, . . . , 18M.

On the other side of the link, receiving unit 14 has N receive antennas 34A, 34B, . . . , 34N in its array 20 for receiving receive signals RS. An RF amplification and down-conversion block 36 processes receive signals RS and passes them to data processing block 38. Data processing block 38 includes a channel measurement or estimation unit (see FIG. 4) which obtains a measurement of the channel coefficients matrix H characterizing channel 22.

A metric-based processing unit 40 uses matrix H and knowledge of the proposed mapping schemes to select an applied mapping scheme which should be used by transmit unit 12. In particular, given a communication parameter which is to be controlled, e.g., maximized or kept within a prescribed range, unit 40 makes a decision about which of the proposed mapping schemes should be selected as the applied mapping scheme under prevailing conditions of channel 22. This selection is fed back as indicated by dashed line 42 to transmit unit 12. In case channel 22 is a time-division duplexed (TDD) channel, which is reciprocal between the receive and transmit units, no separate feedback is required. In response, unit 26 employs the applied mapping scheme in processing data 30. This ensures that a selected communication parameter or parameters are controlled.

Figure 3:
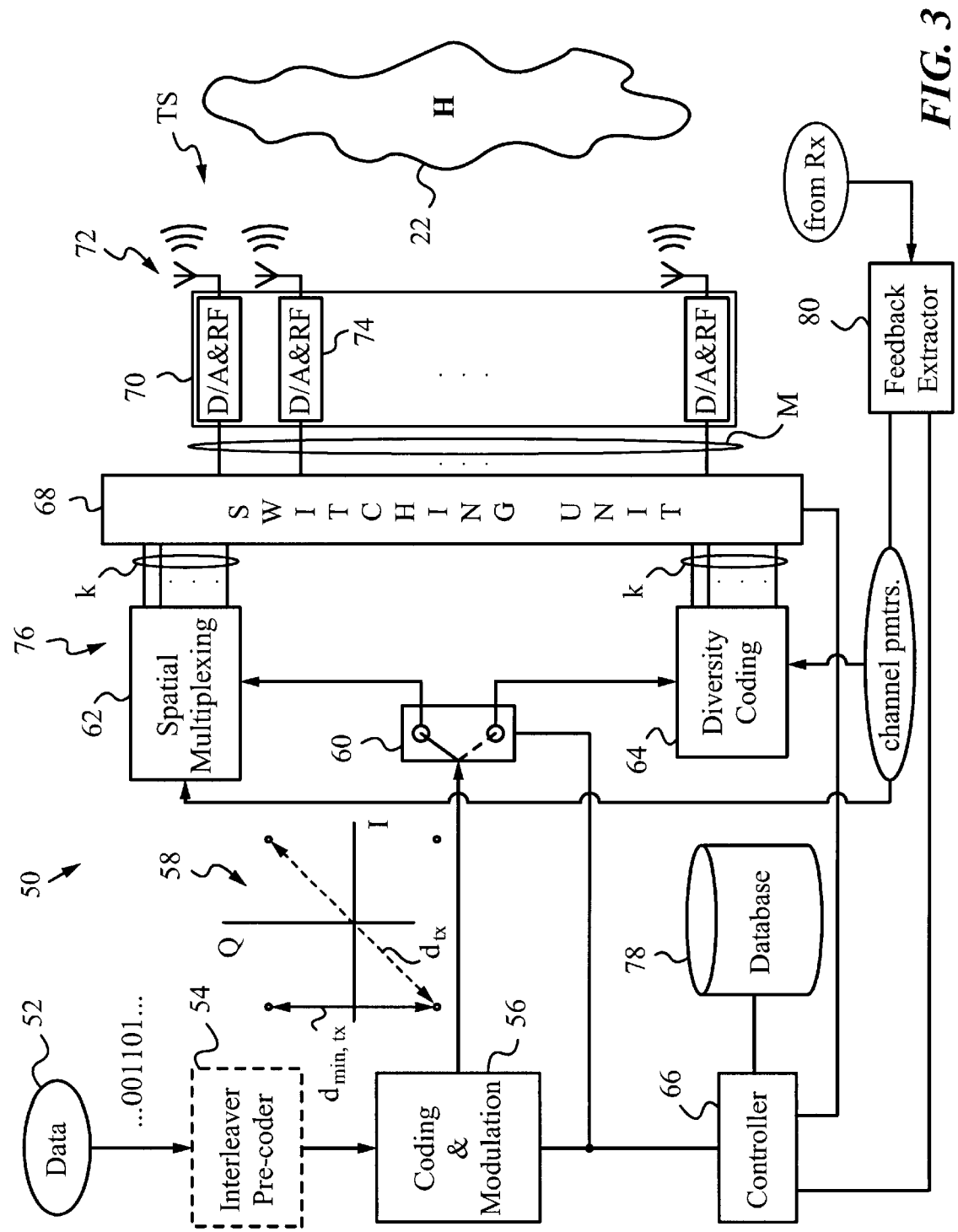
FIG. 3 is a block diagram of an exemplary transmit unit in accordance with the invention.

An exemplary embodiment of a transmit unit 50 for practicing the method of the invention is shown in FIG. 3. Data 52, in this case in the form of a binary stream, has to be transmitted. Before transmission, data 52 may be interleaved and pre-coded by interleaver and pre-coder 54 indicated in dashed lines. The purpose of interleaving and pre-coding is to render the data more robust against errors. Both of these techniques are well-known in the art.

Data 52 is delivered to a conversion unit, more specifically a coding and modulation block 56. Block 56 converts data 52 into symbols at a chosen modulation rate and coding rate. For example, data 52 can be converted into symbols through modulation in a constellation selected from among PSK, QAM, GMSK, FSK, PAM, PPM, CAP, CPM or other suitable constellations. In this embodiment, data 52 is modulated in accordance with 4QAM, represented by a constellation 58 with four points (the axes Q and I stand for quadrature and in-phase). In particular, data 52 is 4QAM modulated at a certain modulation rate and coding rate. The transmission rate or throughput of data 52 will vary depending on the modulation and coding rates.

Table 1, below, illustrates some typical modulation and coding rates with the corresponding constellations which can be used in the proposed mapping schemes. The entries are conveniently indexed by a mapping index.

TABLE 1

| Mapping Index | Modulation Rate (bits/symbol) | Coding Rate | Throughput (bits/s/Hz) | $d_{min,tx}$ | Output Constellation |
|---|---|---|---|---|---|
| 1 | 1 | 1 | 1 | 4 | BPSK |
| 2 | 1 | ½TCM | 1 | 7.2 | 4 PAM |
| 3 | 2 | 1 | 2 | 2 | 4 QAM |
| 4 | 2 | ⅔TCM | 2 | 4.3 | 8 PSK |
| 5 | 3 | 1 | 3 | 0.58 | 8 PSK |
| 6 | 3 | ¾TCM | 3 | 1.32 | 16 PSK |
| 7 | 4 | 1 | 4 | 0.4 | 16 QAM |
| 8 | 4 | ⅘TCM | 4 | 0.8 | 32 QAM |

In this table minimum Euclidean distances $d_{min,tx}$ are listed with symbol energies $E_s$ normalized to equal 1. The abbreviation TCM stands for Trellis Coded Modulation, which is well-known in the art and involves the simultaneous application of coding and modulation. The mapping index column can be used to more conveniently identify the proposed constellations, modulation and coding rates which are to be used as part of the proposed mapping schemes.

Tables analogous to Table 1 for other constellations can be easily derived. Specifically, similar tables can be produced for constellations GMSK, PPM, CAP, CPM and others. It should be noted that modulation and coding are well-known in the art.

The next to last column of Table 1 indicates a minimum Euclidean distance $d_{min,tx}$ in the constellation, where the subscript tx indicates the transmit side. This is the shortest distance between any two points in the constellation. The minimum Euclidean distance between two points in 4QAM constellation 58 is indicated by a solid line. A longer distance dt, is also indicated in a dashed line. The code used increases this minimum Euclidean distance $d_{min,tx}$ as is clear from in Table 1. The minimum Euclidean distances for any other can be calculated or obtained from standard tables. For more information on the derivation of these distances see Stephen B. Wicker, *Error Control Systems for Digital Communication and Storage*, Prentice Hall, 1995, Chapter 14.

Once coded and modulated in symbols, data 52 passes to a switch 60. Depending on its setting, switch 60 routs data 52 either to a spatial multiplexing block 62 or to a diversity coding block 64. Both blocks 62 and 64 have a number k of outputs, where k≦, to permit order k spatial multiplexing or order k diversity coding. A switching unit 68 is connected to blocks 62 and 64 for switching the k order spatially multiplexed or k order diversity coded signals to its M outputs. The M outputs lead to the corresponding M transmit antennas 72 via an up-conversion and RF amplification stage 70 having individual digital-to-analog converters and up-conversion/RF amplification blocks 74.

Together, switch 60, blocks 62, 64 and switching unit 68 act as an assigning unit 76 for assigning data 52 to transmit signals $TS_p$, where p=1. . . M, for transmission from the M transmit antennas 72. It should be noted that for spatial multiplexing of order k or diversity coding of order k, where k<M, not all antennas 72 may be assigned transmit signals $TS_p$. The criteria for selecting which of antennas 72 will be transmitting transmit signals $TS_p$ will be discussed below.

Thus, data 52 undergoes conversion into symbols and assignment to transmit signals $TS_p$ which are transmitted from antennas 72. This conversion and assignment of data 52 represent a mapping scheme. Specifically, all the possible combinations of conversions and assignments represent possible or proposed mapping schemes which can be used by transmitter 50 to transmit data 52 from its M antennas 72 over channel 22.

Transmit unit 50 also has a controller 66 connected to coding and modulation unit 56 and to switch 60. A database 78 of proposed mapping schemes is connected to controller 66. Database 78 conveniently contains tables, e.g., two tables: one for diversity coding and one for spatial multiplexing, or one integrated table or look-up table for both diversity coding and spatial multiplexing. The table or tables contain modulation rates, coding rates, throughputs, and minimum Euclidean distances for mapping schemes employing diversity coding and for mapping schemes employing spatial multiplexing. The tables or table can also include a mapping index column, as does table 1, to simplify the identification of the coding and modulation rates to be used in the proposed mapping schemes. In an integrated table the mapping index can serve as a mapping scheme index to identify all mapping parameters, i.e., whether diversity coding or spatial multiplexing is employed and at what coding rate, modulation rate, throughput and associated minimum Euclidean distance. The convenience of using one mapping scheme index resides in the fact that feed back of mapping scheme index to transmit unit 50 does not require much bandwidth.

Specifically, transmit unit 50 receives feedback denoted Rx from receive unit 90 (see FIG. 4) via a feedback extractor 80. Feedback extractor 80 detects the mapping scheme index and forwards it to controller 66. Controller 66 looks up the corresponding mapping scheme which is to be applied in database 78. In cases where channel parameters, e.g., channel coefficients matrix H, have to be known to employ the applied mapping scheme (e.g., when the diversity coding technique is Maximum Ratio Combining), receive unit 90 may also send the channel parameters to feedback extractor 80. Extractor 80 delivers the channel parameters to controller 66 as well as diversity coding block 64 and spatial multiplexing block 62. In the event of using a time-division duplexed (TDD) channel 22, the feedback information, i.e., the channel parameters are obtained during the reverse transmission from the receive unit or remote subscriber unit, as is known in the art, and no dedicated feedback extractor 80 is required.

Figure 4:
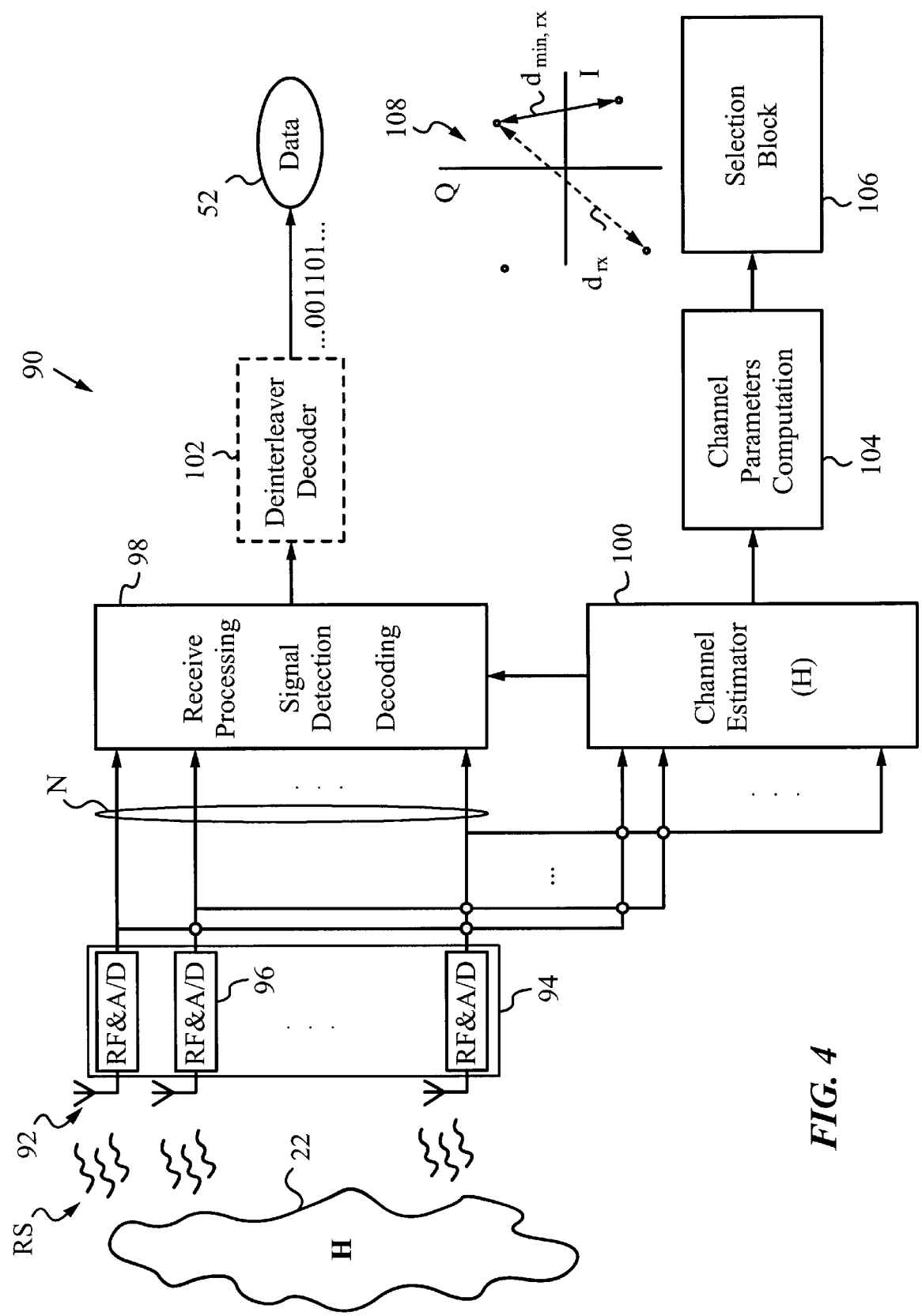
FIG. 4 is a block diagram of an exemplary receive unit in accordance with the invention.

FIG. 4 illustrates receive unit 90 for receiving receive signals RS from transmit unit 50 through channel 22 with N receive antennas 92. Receive unit 90 has an RF amplification and down-conversion stage 94 having individual RF amplification/down-conversion/ and analog-to-digital converter blocks 96 associated with each of the N receive antennas 72. The N outputs of stage 94 are connected to a block 98 which performs receive processing, signal detection and decoding functions. The N outputs of stage 94 are also connected to a channel estimator 100. Channel estimator 100 obtains a measurement of channel 22; in particular, it determines the channel coefficients matrix H representing the action of channel 22 on transmit signals $TS_p$.

Estimator 100 is connected to block 98 to provide block 98 with matrix H for recovery of data 52. Specifically, block 98 uses matrix H to process the received signals RS prior to reversing the operations performed on data 52 at transmit unit 50. The output of block 98 yields the reconstructed data stream. A deinterleaver and decoder unit 102 is placed in the data stream if a corresponding interleaver and coder 54 was employed in transmitter 50 to recover original data 52.

Channel estimator 100 is also connected to a channel parameters computation block 104. Block 104 computes the prevailing parameters of channel 22. In particular, block 104 can compute channel parameters such as SINR, Frobenius norms, singular values, condition of channel coefficients matrix H and other channel parameters. The actual computational circuits for computing these parameters are known to a person skilled in the art.

Block 104 is further connected to a selection block 106. Block 106 analyzes received constellation 108 which corresponds to transmitted constellation 58 after being subjected to the action of the channel 22, i.e., after channel coefficients matrix H is applied. Block 106 selects from the proposed mapping schemes an applied mapping scheme which is to be used in mapping data 52 to transmit antennas 72 of transmit unit 50.

Figure 5A:
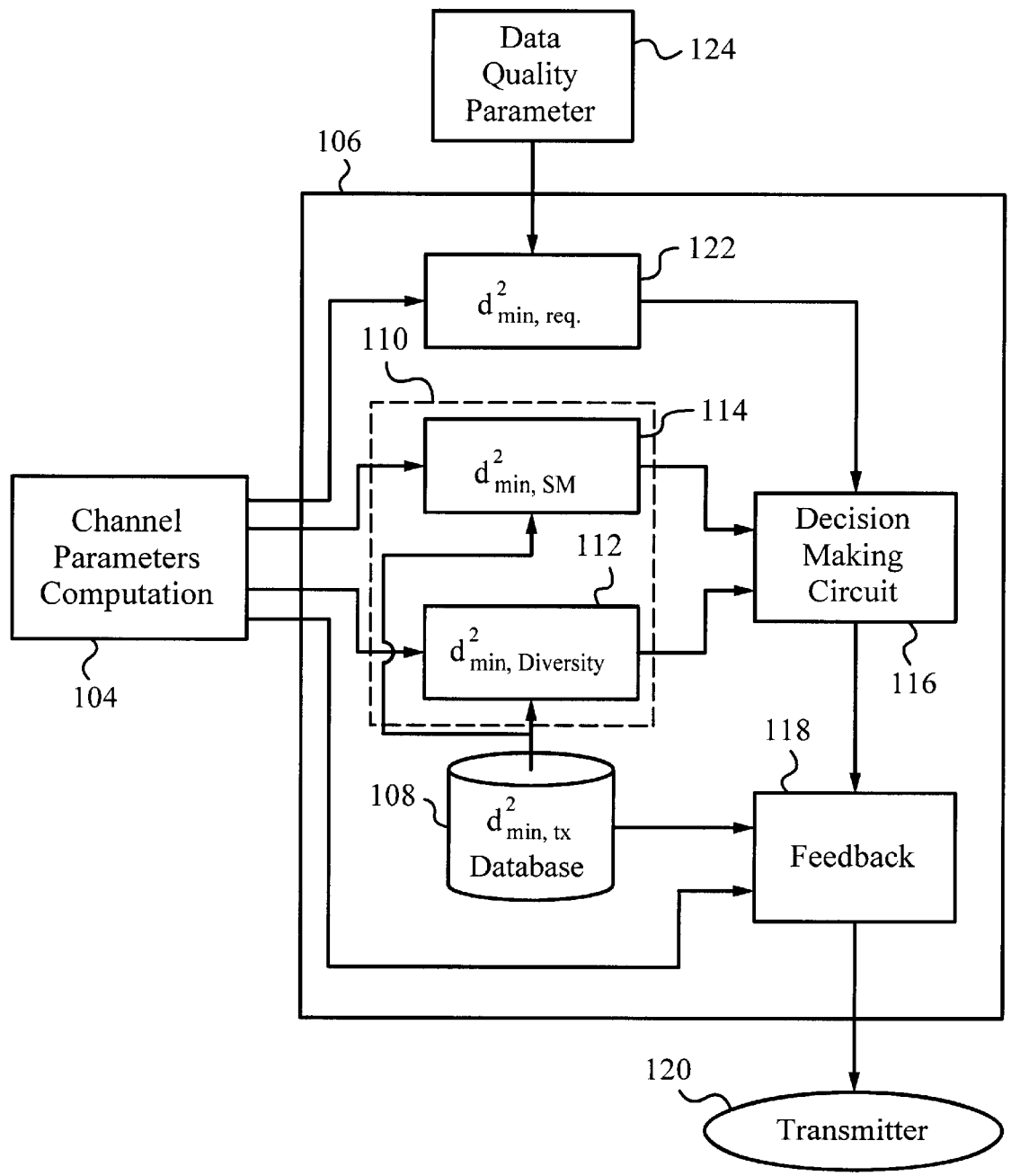
FIG. 5A is a detailed block diagram illustrating a selection block and related components involved in selecting an applied mapping scheme from proposed mapping schemes based on a minimum Euclidean distance metric.

In another embodiment, minimum Euclidean distance $d_{min,rx}$ computed for symbols received is used as the metric for controlling the communication parameter. FIG. 5A illustrates a detailed block diagram showing selection block 106 and related components involved in selecting the applied mapping scheme based on minimum Euclidean distance $d_{min,rx}$. Block 106 contains a database 108 of the minimum Euclidean distances $d^2_{min,tx}$; here these are the distance values squared, for all constellations 58 in the proposed mapping schemes on the transmit side. The distance information in database 108 is associated with the respective proposed mapping schemes and can be ordered in tables for diversity coding and spatial multiplexing with the associated constellations, modulation rates and coding rates in a similar form as in database 78 discussed above. In fact, like database 78, database 108 may contain a copy of an integrated table or look-up table as discussed above. For mathematical reasons, it is convenient to work with the square values of the minimum Euclidean distances and the embodiments described herein shall take advantage of this fact.

Database 108 is connected to a computing block 110. Computing block 110 computes a minimum Euclidean distance $d_{min,rx}$ for received symbols based on matrix H of channel 22. Due to the action of channel 22 minimum Euclidean distance $d^2_{min,tx}$ for the symbols transmitted from transmit unit 50 will have changed in the received symbols. In other words, $d^2_{min,tx} \neq d^2_{min,rx}$ because of the action of channel coefficients matrix H. The actual change in the minimum Euclidean distance between the transmitted and received constellations will depend not only on the constellation, modulation rate and coding rate but also on the assignment of data 52 to transmit signals $TS_p$ for transmission from transmit antennas 72. In other words, the minimum distance depends on the entire proposed mapping scheme. Therefore, computing block 110 has a sub-block 112 for computing $d^2_{min,Diversity}$ for received symbols which are diversity coded and sub-block 114 for computing $d^2_{min,SM}$ for received signals which are spatially multiplexed. Both sub-blocks 112, 114 obtain the value of $d^2_{min,tx}$ from database 108.

The diversity coding methods can include techniques such as space-time block coding, transmit antenna selection, Equal Gain Combining, Maximum Ratio Combining and delay diversity coding. All of these coding methods are described in the prior art. Alternatively, a random assignment of transmit signals $TS_p$ to k of transmit antennas 72 can be made. This is especially useful when transmit unit 50 is initially turned on, since no stable information about channel 22 may be available at that time. The order of the diversity coding methods is k, where $2 \leq k \leq M$. Let us designate the throughput at order k=M diversity coding to be r bits/s/Hz. When k<M—fewer than all M transmit antennas 72 are being used for diversity—the throughput remains at r bits/s/Hz. Sub-block 112 uses the channel coefficients matrix H and $d^2_{min,tx}$ from database 108 to compute $d^2_{min,Diversity}$ to evaluate diversity coding methods listed above. The mathematics involved in these computations will be addressed below. Sub-block 112 then selects from among the $d^2_{min,Diversity}$ values the largest one for each data rate r. This is the best selection since it ensures the lowest probability of data corruption or error.

Spatial multiplexing methods are known in the art. Spatial multiplexing in the present invention can involve a prescribed or a random assignment of transmit signals $TS_p$ to k of transmit antennas 72. Random transmit antenna assignment is especially useful when transmit unit 50 is initially turned on, since no stable information about channel 22 may be available at that time. The order of spatial multiplexing is k, where $2 \leq k \leq M$. Let us designate the throughput per antenna 72 at k-th order spatial multiplexing to be r/k bits/s/Hz. When k<M then M−k transmit antennas 72 are used for diversity.

Sub-block 114 uses the channel coefficients matrix H and $d^2_{min,tx}$ from database 108 to compute $d^2_{min,Sm}$ for the spatial multiplexing methods. The mathematics involved in these computations will be addressed below. Sub-block 114 then selects from among the $d^2_{min,SM}$ values the largest one for each data rate r. This is the best selection since it ensures the lowest probability of data corruption or error.

Computing block 110 is in communication with a decision making circuit 116. Both sub-blocks 112, 114 deliver their choices of the largest $d^2_{min,Diversity}$ and $d^2_{min,SM}$ for each data rate r respectively to decision making circuit 116.

In accordance with another embodiment and as indicated in FIG. 5A, decision making block 116 is also connected to a block 122 whose function is to determine a required minimum Euclidean distance $d^2_{min,required}$. Block 122 is in communication with communication parameters computation block 104 and with a data quality parameter block 124.

Block 124 informs block 122 of a quality parameter, e.g., acceptable bit error rate (BER) or other threshold, which has to be observed. In fact, the quality parameter can be any of the following: signal-to-interference noise ratio, signal-to-noise ratio, power level, level crossing rate, level crossing duration, bit error rate, symbol error rate, packet error rate, and error probability. The quality parameter selected can be dictated by the type of service, e.g., fixed rate service, between transmit unit 50 and receive unit 90, or by other requirements placed on data 52 or any other aspect of the communication link. As an example, a fixed BER is chosen as the quality parameter in this embodiment. The BER is translated into a corresponding probability of error P(e) and supplied to block 122; here P(e) is specifically the probability of symbol error.

Block 104 provides block 122 with the channel parameters, e.g., channel coefficients matrix H. The channel parameters are included in the derivation of $d^2_{min,required}$. In the present embodiment, $d^2_{min,required}$ is derived directly from the required P(e) using an established relationship:

$$P(e) \leq N_e Q\left(\sqrt{\frac{E_s d^2_{\min,required}}{2N_o}}\right)$$

where $N_e$ is the number of nearest neighbors in the constellation and can be found for each proposed mapping scheme based on the channel coefficients matrix H, $Q(x)=\frac{1}{2}\mathrm{erfc}(x/\sqrt{2})$, where erfc is the complementary error function, $E_s$ is the symbol energy and $N_o$ is the noise variance.

When other quality parameters are used, $d^2_{min,required}$ can be derived from other relationships involving different parameters from among those delivered from block 124 and from block 104. In any event, the relation between the quality parameter and $d^2_{min,required}$ necessary to satisfy the quality parameter should be established.

The value of $d^2_{min,required}$ is supplied to decision making circuit 116 and the choice between $d^2_{min,Diversity}$ and $d^2_{min,SM}$ is made such that the value which exceeds $d^2_{min,required}$ and which supports the maximum data rate r is selected. For example, when both values comply with data rate r and are larger than $d^2_{min,required}$ then the larger of the two is chosen. If neither $d^2_{min,Diversity}$ or $d^2_{min,SM}$ is satisfactory, then additional proposed mapping schemes are evaluated by sub-blocks 112, 114 until either one produces a value of $d^2_{min}$ which exceeds $d^2_{min,required}$ and then this value is chosen.

It should also be noted, that when either diversity coding or spatial multiplexing is employed in the proposed mapping schemes, the assignment of transmit signals $TS_p$ to k of the M antennas 72 can be made based on $d^2_{min,required}$. This assignment can be made by choosing the subset k of M transmit antennas 72 which provides the maximum data rate r for the given $d^2_{min,required}$.

During operation receive unit 90 repeats the computation of $d_{min}$ as channel 22 changes. In the case of a moving receiver 90, e.g., a cellular telephone, this recalculation should be performed more frequently, since the channel coherence time is short. In case of a stationary receiver 90, e.g., a wireless modem, the coherence time is longer and $d_{min}$ can be recomputed at longer intervals.

This selection is delivered to a feedback 118, which passes the choice on to a transmitter 120 of the receive unit 90. Transmitter 120 sends the choice of the applied mapping scheme characterized by the largest $d^2_{min}$ at the desired data rate r back to transmit unit 50. Conveniently, transmitter 120 can send the mapping scheme index identifying enabling transmit unit 50 to locate and retrieve the applied mapping scheme from database 78.

The applied mapping scheme includes the modulation rate and coding rate, as well as a choice of the diversity method or spatial multiplexing method which yielded that largest $d^2_{min}$ value picked at decision making block 116. Advantageously, feedback 118 is also connected to channel parameters computation block 104, as shown, to additionally transmit back to transmit unit 50 the parameters of channel 22, e.g., the channel coefficients matrix H, determined at receiver 90.

Figure 5B:
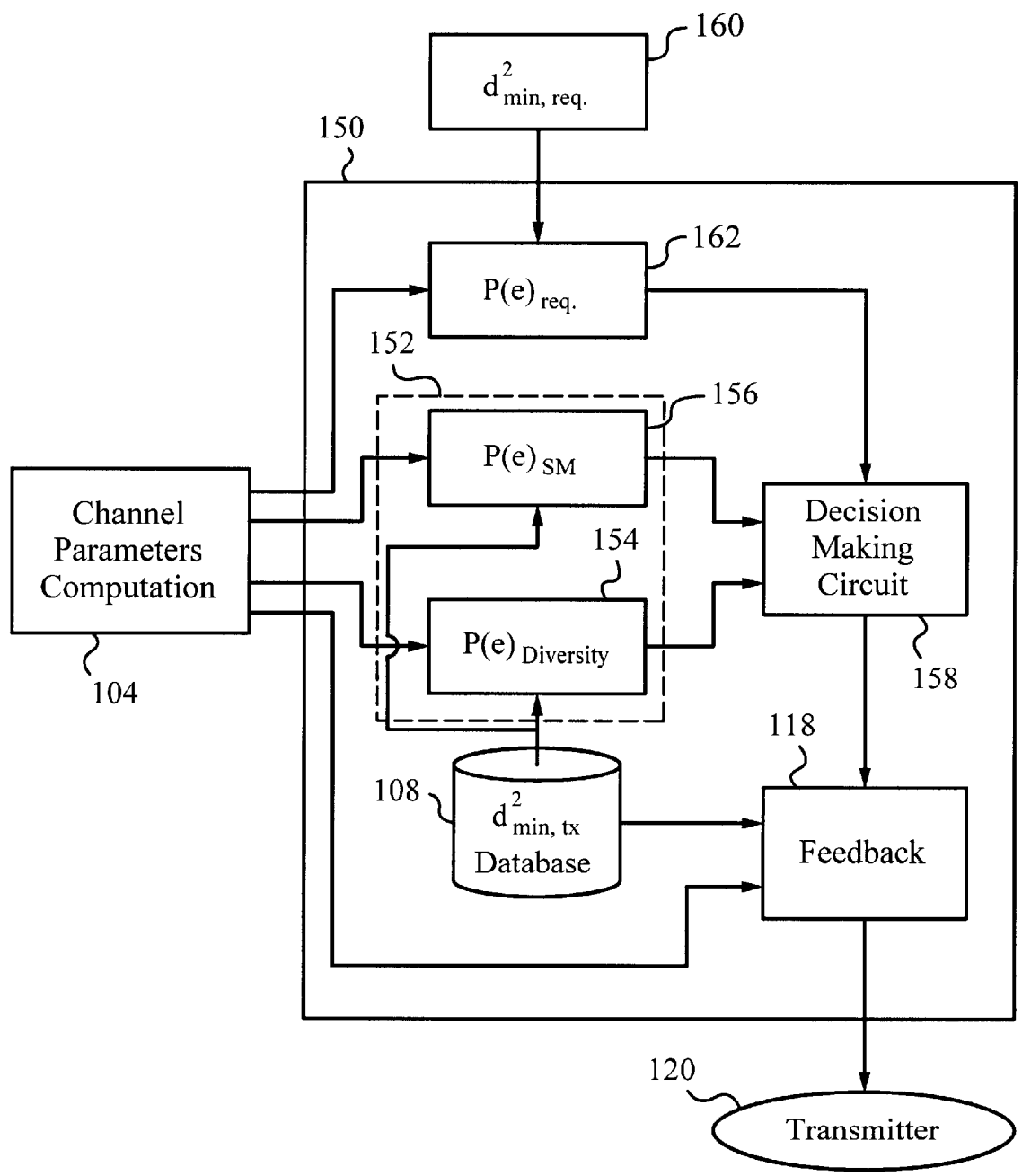
FIG. 5B is a detailed block diagram illustrating a selection block and related components involved in selecting an applied mapping scheme from proposed mapping schemes based on a probability of error metric.

FIG. 5B illustrates an alternative embodiment of the invention in which a selection block 150 relies on the probability of error P(e) as a metric to select the applied mapping scheme from the proposed mapping schemes. Analogous blocks in this embodiment retain the reference numbers from FIG. 5A. In particular a computing block 152 has two sub-blocks 154, 156 for computing the probability of error for diversity coding $P(e)_{Diversity}$ and probability of error for spatial multiplexing $P(e)_{SM}$ for each data rate r.

Sub-blocks 154, 156 are connected to a decision making circuit 158. Of the $P(e)_{Diversity}$ and $P(e)_{SM}$ values circuit 158 chooses the one which is the lowest from the proposed mapping schemes and supports the highest data rate r. This choice is fed back via transmitter 120 to transmit unit 50 as in the above-described embodiment.

Preferably, a block 160 provides the $d^2_{min,required}$ value based on a quality parameter, e.g., a desired BER in the case of fixed BER service, to a block 162 for computing the required probability of error $P(e)_{required}$. Once again, the relationship:

$$P(e) \leq N_e Q\left(\sqrt{\frac{E_s d^2_{min,required}}{2N_o}}\right)$$

can be used in this computation. Block 162 uses $d^2_{min,required}$ as well as channel parameters from communication parameters computation block 104 to compute P(e)required. This computed value of $P(e)_{required}$ is then supplied to decision making circuit 158 to select the suitable value from among the $P(e)_{Diversity}$ and $P(e)_{SM}$ values for the proposed mapping schemes. In this case the lowest value of P(e) is selected.

It should be noted that in the event transmit unit 50 receives feedback of channel information, whether using TDD or simple feedback, it could make the selection of applied mapping scheme on its own. In other words, transmit unit 50 can select the mapping scheme index and apply the corresponding mapping scheme from database 78. This alternative approach would be convenient when receive unit 90 does not have sufficient resources or power to evaluate the proposed mapping schemes. Of course, transmit unit 50 would then contain all the corresponding computation and decision-making blocks contained in receive unit 90 as described above.

Figure 6:
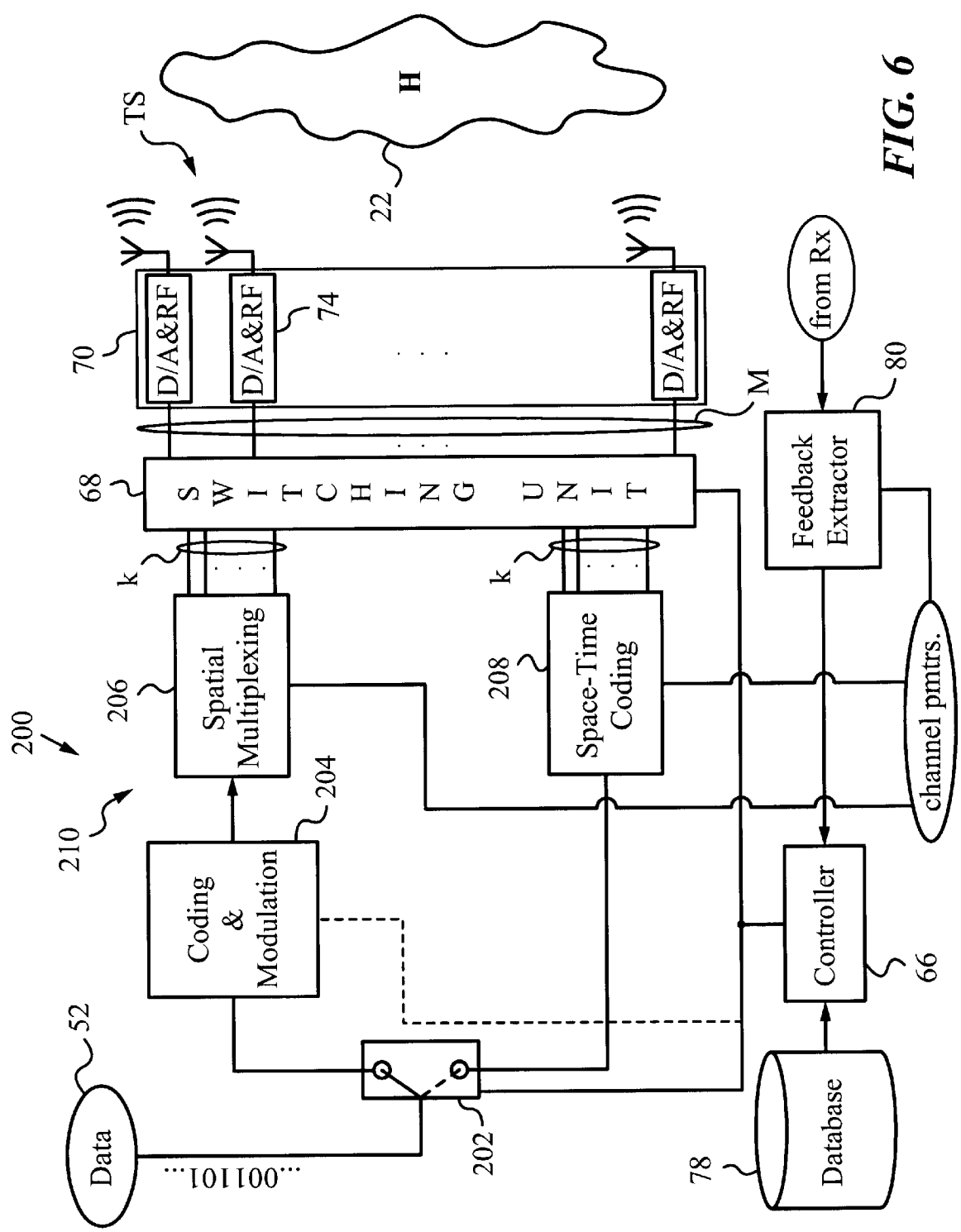
FIG. 6 is a block diagram of another transmit unit in accordance with the invention.

FIG. 6 illustrates another embodiment of a transmit unit 200. Corresponding parts have been labeled with the same reference numbers as in FIG. 3. In this case, data 52 to be transmitted is first delivered to a switch 202. Depending on the setting of switch 202 data 52 is passed either to a coding and modulation block 204 and spatial multiplexing block 206 or to a space-time coding block 208. In this embodiment space-time coding block 208 assumes all the functions of coding, modulating and applying a diversity technique to data 52. Meanwhile, blocks 204 and 206 implement coding, modulation and spatial multiplexing respectively.

Both blocks 206 and 208 have a number k of outputs, where $k \leq M$, to permit order k spatial multiplexing or order k diversity coding respectively. Switching unit 68 is connected to blocks 206 and 208 for switching the k order spatially multiplexed or k order diversity coded signals to its M outputs. The M outputs lead to the corresponding M transmit antennas 72 via up-conversion and RF amplification stage 70 having individual digital-to-analog converters and up-conversion/RF amplification blocks 74.

Together, switch 202, blocks 204, 206, 208 and switching unit 68 act as an assigning unit 210 for assigning data 52 to transmit signals $TS_p$, where p=1. . . M, for transmission from the M transmit antennas 72. As in transmit unit 50, the criteria for selecting the applied mapping scheme will dictate the setting of switch 202 and operation of blocks 206, 208, 68. In other words, the applied mapping scheme will be used to set all parameters of assigning unit 210. As before, this function is achieved with the aid of feedback denoted Rx from receive unit 90 (see FIG. 4) via a feedback extractor 80. Feedback extractor 80 detects the mapping scheme index and forwards it to controller 66. Controller 66 looks up the corresponding mapping scheme which is to be applied in database 78. In cases where channel parameters, e.g., channel coefficients matrix H, have to be known to employ the applied mapping scheme receive unit 90 may also send the channel parameters. Extractor 80 delivers the channel parameters to controller 66 as well as spatial multiplexing block 206 and space-time coding block 208. Once again, in the event of using a time-division duplexed (TDD) channel 22, the feedback information, i.e., the channel parameters are obtained during the reverse transmission from the receive unit or remote subscriber unit, as is known in the art, and no dedicated feedback extractor 80 is required.

The above embodiments will provide a person of average skill in the art with the necessary information to use the two metrics, minimum Euclidean distance and probability of error for making the appropriate selection of applied mapping scheme in communications systems with various multi-antenna transmit and receive units. In addition, the below examples suggest some specific implementations to further clarify the details to a person of average skill in the art. The transmit diversity coding in these examples includes space-time block coding, selection of k transmit antennas, equal gain combining and maximum ratio combining. The spatial multiplexing in these examples includes spatial multiplexing using a maximum likelihood (ML) receiver, spatial multiplexing with a linear receiver such as a zero-forcing equalizer (ZFE) receiver and minimum mean square error (MMSE) receiver and spatial multiplexing with successive canceling receiver.

At a data transfer rate r and minimum Euclidean distance $d^2_{min,tx}$ of the transmitted constellation, the minimum Euclidean distance for space-time block coding (stbc) is $d^2_{min,stbc}$ on the receive end and is expressed in terms of channel coefficients matrix H. H is an $M_r \times M_t$ matrix where $M_r$ is the number of receive antennas 92 and $M_t$ is the number of transmit antennas 72 known to the receiver with the Frobenius norm defined as:

$$\|H\|_F := \sqrt{\sum_{k=1}^{M_t}\sum_{m=1}^{M_r}|h_{km}|^2} = \sqrt{\sum_{k=1}^{\min(M_t,M_r)}\lambda_k^2}$$

where $\lambda_k^2$ are the squared singular values. This allows us to write:

$$d^2_{min,stbc} = \frac{\|H\|_F^2}{M_t}d^2_{min,tx}$$

$$= \frac{\sum_{k=1}^{M_t}\sum_{m=1}^{M_r}|h_{km}|^2}{M_t}d^2_{min,tx}$$

$$= \frac{\sum_{k=1}^{\min(M_t,M_r)}\lambda_k^2}{M_t}d^2_{min,tx}.$$

Clearly, performance is sensitive only to the power in H averaged by the number of transmit antennas 72, i.e., $\|H\|_F^2/M_t$. The computations can be carried out, e.g., in computing block 110, and more specifically in sub-block 114, after it is supplied with the channel H from communication parameters computation block 104 and $d^2_{min,tx}$ from database 108.

In selection diversity one (k=1) of the M transmit antennas 72 can be chosen to maximize a quality parameter such as received SNR. In this case, when data is transmitted at rate r and the minimum Euclidean distance is $d^2_{min,sel}$ on the transmit end, the minimum Euclidean distance $d^2_{min,sel}$ of the constellation has another expression at the receive end. Let $h_k$ be the k-th column of H. Then the minimum Euclidean distance $d^2_{min,sel}$ in can be written as:

$$d^2_{min,sel} = \max_k \|h_k\|^2 d^2_{min,tx}.$$

It should be noted that $d^2_{min,sel} \geq d^2_{min,stbc}$ since the maximum norm of one column is always greater than the average of the norms of all the columns. Using formalisms known in the art a more direct relationship can be written as:

$$d^2_{min,sel} \geq \frac{\lambda^2_{max}(H)d^2_{min,t}}{M_t}$$

$$\geq \frac{\sum_{k=1}^{\min(M_t,M_r)}\lambda_k^2}{M_t}d_{min,tx}$$

$$= d^2_{min,stbc},$$

and also $$d^2_{min,sel} \leq M_r\lambda_{max}^2(H)d^2_{min,tx}.$$

From the above it is clear that selection diversity is always better than space-time block coding for a given channel. Typically, antenna selection should be employed when at least some partial knowledge of H is available while space-time block coding can be used at system start-up when little or no knowledge of H is available.

For generalized transmit equal gain combining, one finds an optimal transmit vector which maximizes a quality parameter, e.g., SNR, under the constraint that the vector consists purely of phase coefficients. This vector, w, with its components corresponding to transmit signals, can be defined as:

$$w = [1e^{j\phi_1} \ldots e^{j\phi_{N-1}}]/\sqrt{M_r}.$$

The solution is found by solving for $\phi_1, \ldots \phi_{N-1}$ such that w'H'Hw is maximized. This can be done by optimization techniques well-known in the art. It is useful to recognize that:

$$d^2_{min,egc} \leq d^2_{min,mrc} = d_{,min,tx}\lambda_{max}^2(H),$$

where mrc stands for maximum ratio combining as described below. In practice, one can set these two minimum Euclidean distances as approximately equal ($d^2_{min,erc} \approx d^2_{min,mrc}$) and therefore use techniques developed for maximum ratio combining.

For generalized transmit maximum ratio combining, one can find an optimal transmit vector which maximizes a quality parameter, e.g., SNR. It should be noted that this is usually the best of such linear techniques. This vector, once again denoted w, is normalized such that $\|w\|^2 = 1$ and is found by maximizing $E_s$w'H'Hw/$N_o$ subject to this normalization condition. The solution, found through linear algebra, is $w = w_{max}$ the correct singular vector corresponding to the maximum singular value. Given this one can write $d^2_{min,mrc}$ as:

$$d^2_{min,mrc} = d^2_{min,tx}w'H'Hw = d^2_{min,tx}\lambda_{max}^2(H).$$

It should be noted that $d^2_{min,mrc} \geq d^2_{min,egc} \geq d^2_{min,sel}$.

When employing spatial multiplexing the computations can be carried out, e.g., by sub-block 112 in computing block 110. In spatial multiplexing the type of receive unit 90 is important.

In the first example receive unit 90 is of the ML type. Let s and ŝ be the transmitted and hypothesized (received) vectors, respectively, both of dimensions $M_t \times 1$. The coefficients in these vectors come from the selected QAM constellation (with $|A|$ points) which is assumed the same for each of transmit antennas 72. The average power of the per-antenna constellation is taken to be one. Let $d^2_{min,s}$ denote the minimum distance of this per antenna constellation. Let S denote the set of all $|A|^{M_t}$ possible s vectors. Then we can write the minimum Euclidean distance $d^2_{min,sm-ml}$ the received constellation as:

$$d^2_{min,sm-ml} = \arg\min_{s,\hat{s} \in S} \frac{\|H(s-\hat{s})\|^2}{M_t}.$$

Using well-known mathematical techniques bounds and approximations can be used to simplify this expression. For example, the upper bound on $d^2_{min,sm-ml}$ can be defined by denoting E as the space of error vectors e where $E = \{s-\hat{s} \neq 0 | s, \hat{s} \in S\}$, and $\tilde{E}$ as the space of error vectors with some of the error vectors removed therefrom as follows:

$$d^2_{min,sm-lm} \leq \arg\min_{e \in \tilde{E}} \frac{\|He\|^2}{M_t},$$

where $\underline{e}$ is an element of $\tilde{E}$. Alternatively, a lower bound on $d^2_{min,sm-ml}$ can be defined as follows:

$$d^2_{min,sm-ml} \geq \frac{\lambda^2_{min}(H) d^2_{min,s}}{M_t}.$$

The upper bound is optimistic, meaning that it will tend to predict a minimum Euclidean distance which may be greater than it actually is in practice. The lower bound is pessimistic, meaning that it will tend to predict a minimum Euclidean distance which may be smaller than in practice. A person of average skill in the art will appreciate that, depending on the required reliability of the communication system either bound can be used. Alternatively, the two bounds can be averaged or used together in some other manner to yield the minimum Euclidean distance in spatial multiplexing with ML receive unit 90.

In another example receive unit 90 is a successive receiver, which estimates a single data stream, subtracts that stream out, estimates the next data stream, subtracts it out and so on. The performance of this type of receiver is computed based on the following algorithm:

1) start with $M_t$ data streams and let $H_i = H$;
2) find G, which is a ZF/MMSE inverse of H;
3) let $g_i$ be the row of G with the minimum norm, i.e., $\|g_i\|^2 \leq \|g_j\|^2$ for all $j \neq i$;
4) apply $g_i$ to H to estimate the i-th stream of data;
5) subtract out the i-th stream of data and remove the i-th column of H to form a new channel coefficients matrix $H_{i-1}$;
6) repeat the above steps using the new (reduced) channel coefficients matrix $H_{i-1}$.

Let $\{g_i\}_{i=1}^{M_1}$ be the sequence of linear equalizers with results from the above recursion. Then we can estimate the performance of receive unit 90 (assuming no feedback errors) as follows:

$$d^2_{min,cnc} = \arg\min_{\{g_i\}_{i=1}^{M_t}} \frac{d^2_{min,s} \|g_i H_i\|^2}{\|g_i\|^2 M_t}$$

The performance is essentially determined by linear receiver $g_i$ which has the highest norm. When receive unit 90 is a ZF receiver, then the above expression simplifies to:

$$d^2_{min,cnc} = \arg\min_{\{g_i\}_{i=1}^{M_t}} \frac{d^2_{min,s}}{\|g_i\|^2 M_t}.$$

In yet another example, receive unit 90 is a linear receiver which first separates all the data streams using a linear equalizer (not shown) and then detects each stream independently. Let G be a linear receiver. For example, in the ZF case $G = H^+$ or in the MMSE case $G = [HH' + I/SNR]^{-1}H'$. Let $g_i$ be the i-th column of G. Then the minimum Euclidean distance of the receiver can be written as:

$$d^2_{min,ln} = \arg\min_{\{g_i\}_{i=1}^{M_t}} \frac{d^2_{min,s} \|g_i H_i\|^2}{\|g_i\|^2}.$$

Once again, when receive unit 90 is a ZF receiver this equation can be rewritten as:

$$d^2_{min,ln} = \arg\min_{\{g_i\}_{i=1}^{M_t}} \frac{d^2_{min,s}}{\|g_i\|^2 M_t},$$

where the performance depends on the largest magnitude of $g_i$. Using a well-known property from linear algebra, namely $\max \|g_i\|^2 \leq 1/\lambda_{min}^2(H)$ the above equation can used to derive a lower bound as follows:

$$d^2_{min,ln} \geq \frac{(\lambda^2(H))_{min} d^2_{min,s}}{M_t}.$$

In this case, the performance will be influenced by the minimum singular value of H.

When the selection between diversity coding and spatial multiplexing is performed based on the minimum Euclidean distance metric as described above it is advantageous to observe the following procedure. Once the estimate of H is available and fixed transmission rate r is given the mode of operation yielding the best performance is selected by:

1) computing $d^2_{min,Diversity}$ for the desired diversity coding;
2) computing $d^2_{min,SM}$ for the desired spatial multiplexing;
3) choosing diversity coding if $d^2_{min,Diversity} \geq d^2_{min,SM}$ otherwise choosing spatial multiplexing.

Communication systems employing the metrics of the invention to select applied mapping schemes from proposed mapping schemes can be based on any multiple access technique including TDMA, FDMA, CDMA and OFDMA.

It will be clear to one skilled in the art that the above embodiment may be altered in many ways without departing from the scope of the invention. Accordingly, the scope of the invention should be determined by the following claims and their legal equivalents.

What is claimed is:

1. A method of controlling a communication parameter of a channel for transmitting data between a transmit unit having a number M of transmit antennas and a receive unit having a number N of receive antennas, said method comprising:

a) providing proposed mapping schemes for converting said data into symbols and assigning said data to transmit signals $TS_p$, where $p = 1 \ldots M$, for transmission from said M transmit antennas;

b) obtaining a measurement of said channel at said receiver;

c) using said measurement to compute for each of said proposed mapping schemes a minimum Euclidean distance $d_{min,rx}$ of said symbols when received; and d) selecting an applied mapping scheme from said proposed mapping schemes based on said minimum Euclidean distance $d_{min,rx}$, thereby controlling said communication parameter.

2. The method of claim 1, wherein said proposed mapping schemes comprise modulating said data in a constellation selected from the group consisting of PSK, QAM, GMSK, FSK, PAM, PPM, CAP, CPM.

3. The method of claim 1, wherein said proposed mapping schemes comprise coding said data at predetermined coding rates.

4. The method of claim 1, wherein said proposed mapping schemes comprise at least one method selected from the group consisting of diversity coding and spatial multiplexing.

5. The method of claim 4, wherein said at least one method comprises diversity coding of order k ranging from 1 to M.

6. The method of claim 5, wherein said diversity coding is selected from the techniques consisting of space-time block coding, transmit antenna selection, Equal Gain Combining, Maximum Ratio Combining and delay diversity coding.

7. The method of claim 5, wherein said proposed mapping scheme comprises a random assignment of said transmit signals $TS_p$ to a number k of said M antennas.

8. The method of claim 5, wherein said proposed mapping scheme comprises an assignment of said transmit signals $TS_p$ to a number k of said M antennas based on a required minimum Euclidean distance $d_{min,required}$.

9. The method of claim 8, wherein said required minimum Euclidean distance $d_{min,required}$ is related to a quality parameter of said data.

10. The method of claim 4, wherein said at least one method comprises spatial multiplexing of order k ranging from 1 to M.

11. The method of claim 10, wherein said spatial multiplexing comprises a random assignment of said transmit signals $TS_p$ to a number k of said M antennas.

12. The method of claim 10, wherein said spatial multiplexing comprises an assignment of said transmit signals $TS_p$ to a number k of said M antennas based on a required minimum Euclidean distance $d_{min,required}$.

13. The method of claim 12, wherein said required minimum Euclidean distance $d_{min,required}$ is related to a quality parameter of said data.

14. The method of claim 10, wherein said receive unit is selected from the group consisting of maximum likelihood receivers, zero forcing equalizer receivers, successive cancellation receivers and minimum mean square error receivers.

15. The method of claim 1, wherein a minimum Euclidean distance $d_{min,tx}$ of said symbols when transmitted is stored in a database.

16. The method of claim 15, wherein said database is located in a unit selected from the group consisting of said transmit unit and said receive unit.

17. The method of claim 1, wherein said communication parameter is selected from the group consisting of data capacity, signal quality, spectral efficiency and throughput.

18. The method of claim 1, further comprising:

a) determining a quality parameter of said data;

b) establishing a relation between said quality parameter and a required minimum Euclidean distance $d_{min,required}$ necessary to satisfy said quality parameter.

19. The method of claim 18, wherein said quality parameter is selected from the group consisting of signal-to-interference noise ratio, signal-to-noise ratio, power level, level crossing rate, level crossing duration, bit error rate, symbol error rate, packet error rate, and error probability.

20. The method of claim 1, wherein said transmit unit and said receive unit operate in accordance with at least one multiple access technique selected from the group consisting of TDMA, FDMA, CDMA, OFDMA.

21. The method of claim 20, wherein said proposed mapping schemes comprise diversity coding selected from the group consisting of space-time block coding, transmit antenna selection, Equal Gain Combining, Maximum Ratio Combining and delay diversity coding.

22. A method of controlling a communication parameter of a channel for transmitting data between a transmit unit having a number M of transmit antennas and a receive unit having a number N of receive antennas, said method comprising:

a) providing proposed mapping schemes for converting said data into symbols and assigning said data to transmit signals $TS_p$, where p=1 ... M, for transmission from said M transmit antennas;

b) obtaining a measurement of said channel at said receiver;

c) using said measurement to compute for each of said proposed mapping schemes a probability of error P(e) in said symbols when received; and d) selecting an applied mapping scheme from said proposed mapping schemes based on said probability of error P(e), thereby controlling said communication parameter.

23. The method of claim 22, wherein said proposed mapping schemes comprise modulating said data in a constellation selected from the group consisting of PSK, QAM, GMSK, FSK, PAM, PPM, CAP, CPM.

24. The method of claim 22, wherein said proposed mapping schemes comprise coding said data at predetermined coding rates.

25. The method of claim 22, wherein said proposed mapping schemes comprise at least one method selected from the group consisting of diversity coding and spatial multiplexing.

26. The method of claim 25, wherein said at least one method comprises diversity coding of order k ranging from 1 to M.

27. The method of claim 26, wherein said diversity coding is selected from the techniques consisting of space-time block coding, transmit antenna selection, Equal Gain Combining, Maximum Ratio Combining and delay diversity coding.

28. The method of claim 26, wherein said proposed mapping scheme comprises a random assignment of said transmit signals $TS_p$ to a number k of said M antennas.

29. The method of claim 26, wherein said proposed mapping scheme comprises an assignment of said transmit signals $TS_p$ to a number k of said M antennas based on a required probability of error $P(e)_{req}$.

30. The method of claim 25, wherein said at least one method comprises spatial multiplexing of order k ranging from 1 to M.

31. The method of claim 30, wherein said spatial multiplexing comprises a random assignment of said transmit signals $TS_p$ to a number k of said M antennas.

32. The method of claim 30, wherein said spatial multiplexing comprises an assignment of said transmit signals $TS_p$ to a number k of said M antennas based on a required probability of error $P(e)_{req}$.

33. The method of claim 30, wherein said receive unit is selected from the group consisting of maximum likelihood receivers, zero forcing equalizer receivers, successive cancellation receivers and minimum mean square error receivers.

34. The method of claim 22, wherein a minimum Euclidean distance $d_{min,tx}$ of said symbols when transmitted is stored in a database.

35. The method of claim 34, wherein said database is located in a unit selected from the group consisting of said transmit unit and said receive unit.

36. The method of claim 22, wherein said communication parameter is selected from the group consisting of data capacity, signal quality, spectral efficiency and throughput.

37. The method of claim 22, wherein said transmit unit and said receive unit operate in accordance with at least one multiple access technique selected from the group consisting of TDMA, FDMA, CDMA, OFDMA.

38. The method of claim 37, wherein said proposed mapping schemes comprise diversity coding selected from the group consisting of space-time block coding, transmit antenna selection, Equal Gain Combining, Maximum Ratio Combining and delay diversity coding.

39. A communication system with a controlled communication parameter of a channel for transmitting data between a transmit unit having a number M of transmit antennas and a receive unit having a number N of receive antennas, said transmit unit having a mapping circuit comprising:
   a) a conversion unit for converting said data into symbols;
   b) an assigning unit for assigning said data to transmit signals $TS_p$, where p=1 . . . M, for transmission from said M transmit antennas, said converting and said assigning being in accordance with proposed mapping schemes;
said receive unit comprising:
   a) a channel estimator for obtaining a measurement of said channel;
   b) a computing block for computing for each of said proposed mapping schemes a minimum Euclidean distance $d_{min,rx}$ of said symbols when received; and
   c) a selection block for selecting an applied mapping scheme from said proposed mapping schemes based on said minimum Euclidean distance $d_{min,rx}$, thereby controlling said communication parameter.

40. The communication system of claim 39, wherein said assigning unit comprises a diversity coding block and a spatial multiplexing block.

41. The communication system of claim 40, wherein said diversity coding block comprises at least one block selected from the group consisting of a space-time coding block, a transmit antenna selection block, Equal Gain Channel coding block, Maximum Ratio Channel coding block and delay diversity coding block.

42. The communication system of claim 40, wherein said receive unit is selected from the group consisting of maximum likelihood receivers, zero forcing equalizer receivers, successive cancellation receivers and minimum mean square error receivers.

43. The communication system of claim 39, further comprising a database for storing a minimum Euclidean distance $d_{min,tx}$ for said symbols when transmitted.

44. The communication system of claim 39, wherein said computing block is selected from the group consisting of blocks for computing data capacity, signal quality, spectral efficiency and throughput.

45. The communication system of claim 44, further comprising a quality parameter computation block for determining a quality parameter of said data, said quality parameter being selected from the group consisting of signal-to-interference noise ratio, signal-to-noise ratio, power level, level crossing rate, level crossing duration, bit error rate, symbol error rate, packet error rate, and error probability.

46. The communication system of claim 45, further comprising an assessment block for establishing a correlation between said quality parameter and a required minimum Euclidean distance $d_{min,required}$.

47. The communication system of claim 39, said communication system operating in accordance with at least one multiple access technique selected from the group consisting of TDMA, FDMA, CDMA, OFDMA.

48. A communication system with a controlled communication parameter of a channel for transmitting data between a transmit unit having a number M of transmit antennas and a receive unit having a number N of receive antennas, said transmit unit having a mapping circuit comprising:
   a) a conversion unit for converting said data into symbols;
   b) an assigning unit for assigning said data to transmit signals $TS_p$, where p=1 . . . M, for transmission from said M transmit antennas, said converting and said assigning being in accordance with proposed mapping schemes;
said receive unit comprising:
   a) a channel estimator for obtaining a measurement of said channel;
   b) a computing block for computing for each of said proposed mapping schemes a probability of error P(e) of said symbols when received; and
   c) a selection block for selecting an applied mapping scheme from said proposed mapping schemes based on said probability of error P(e), thereby controlling said communication parameter.

49. The communication system of claim 48, wherein said assigning unit comprises a diversity coding block and a spatial multiplexing block.

50. The communication system of claim 49, wherein said receive unit is selected from the group consisting of maximum likelihood receivers, zero forcing equalizer receivers, successive cancellation receivers and minimum mean square error receivers.

51. The communication system of claim 48, wherein said diversity coding block comprises at least one block selected from the group consisting of a space-time coding block, a transmit antenna selection block, Equal Gain Channel coding block, Maximum Ratio Channel coding block and delay diversity coding block.

52. The communication system of claim 48, further comprising a database for storing a required probability of error $P(e)_{req}$.

53. The communication system of claim 48, wherein said computing block is selected from the group consisting of blocks for computing data capacity, signal quality, spectral efficiency and throughput.

54. The communication system of claim 53, further comprising a quality parameter computation block for determining a quality parameter of said data, said quality parameter being selected from the group consisting of signal-to-interference noise ratio, signal-to-noise ratio, power level, level crossing rate, level crossing duration, bit error rate, symbol error rate, packet error rate, and error probability.

55. The communication system of claim 48, said communication system operating in accordance with at least one multiple access technique selected from the group consisting of TDMA, FDMA, CDMA, OFDMA.

* * * * *